United States Patent
Chang

(10) Patent No.: US 10,395,621 B2
(45) Date of Patent: Aug. 27, 2019

(54) METHOD, SYSTEM AND APPARATUS FOR MODIFYING A FONT CHARACTER

(71) Applicant: CANON KABUSHIKI KAISHA, Tokyo (JP)

(72) Inventor: Albert Chang, Lindfield (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/379,331

(22) Filed: Dec. 14, 2016

(65) Prior Publication Data
US 2017/0169798 A1 Jun. 15, 2017

(30) Foreign Application Priority Data

Dec. 15, 2015 (AU) ................................ 2015268723

(51) Int. Cl.
*G06K 9/00* (2006.01)
*G09G 5/26* (2006.01)
*G06F 17/21* (2006.01)
*G09G 5/28* (2006.01)

(52) U.S. Cl.
CPC ............. *G09G 5/26* (2013.01); *G06F 17/214* (2013.01); *G06K 9/00416* (2013.01); *G09G 5/28* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,105,471 A | * | 4/1992 | Yoshida | G06K 15/02 382/256 |
| 5,233,685 A | * | 8/1993 | Landes | G06F 3/1297 715/234 |
| 5,579,416 A | * | 11/1996 | Shibuya | G06F 3/04845 345/467 |

(Continued)

FOREIGN PATENT DOCUMENTS

| JP | 05080741 A | * | 4/1993 |
|---|---|---|---|
| JP | 05080741 A | * | 4/1993 |

OTHER PUBLICATIONS

Diana Berg, (Mar. 3, 2010), All About Transformation in Adobe Illustrator, Retrieved Jul. 27, 2015, from http://design.tutsplus.com/tutorials/all-about-transformation-in-adobe-illustrator-vector-3431.

(Continued)

*Primary Examiner* — Tsung Yin Tsai
(74) *Attorney, Agent, or Firm* — Canon U.S.A., Inc. IP Division

(57) ABSTRACT

A method of modifying a font character. An outline of the font character is received, the outline being a vector representation of the character. A slant angle parameter to be applied to the font outline is received, the slant angle specifying an amount of shearing to be applied to the font outline. A modified stroke width is determined for each segment of the font outline according to an initial angle of the segment and the slant angle, the modified stroke width being proportional to ratio of a length of the segment before and after applying the slant angle to the outline. The modified stroke width is used for adjusting an initial stroke width of the segment to compensate for changes to stroke width of the segment caused by applying the slant angle. The font character is rendered using the modified stroke width of the segments.

8 Claims, 14 Drawing Sheets

(56) References Cited

U.S. PATENT DOCUMENTS

| | | | |
|---|---|---|---|
| 5,715,473 A | 2/1998 | Reed | |
| 5,771,035 A * | 6/1998 | Imaki | G06T 11/203 |
| | | | 345/471 |
| 6,678,410 B1 * | 1/2004 | Phinney | G06K 15/02 |
| | | | 345/171 |
| 2006/0164665 A1 * | 7/2006 | Park | G06K 15/02 |
| | | | 358/1.11 |

OTHER PUBLICATIONS

Shear mapping, (Jul. 19, 2015), In Wikipedia, The Free Encyclopedia. Retrieved Jul. 27, 2015, from https://en.wikipedia.org/w/index.php?title=Shear_mapping&oldid=751000234.

Simonson M., 'Fake vs. True Italics', [retrieved from internet on Feb. 21, 2017], URL:http://web.archive.org/web/20130528110356/http://www.marksimonson.com/notebook/view/FakevsTrueItalics, Published on May 28, 2013 as per the Wayback Machine.

Donald E. Knuth, The Metafont Book, American Mathematical Society and Addison-Wesley Publishing Company, Reading, 1986, ISBN 0-201-13444-6 (soft).

* cited by examiner

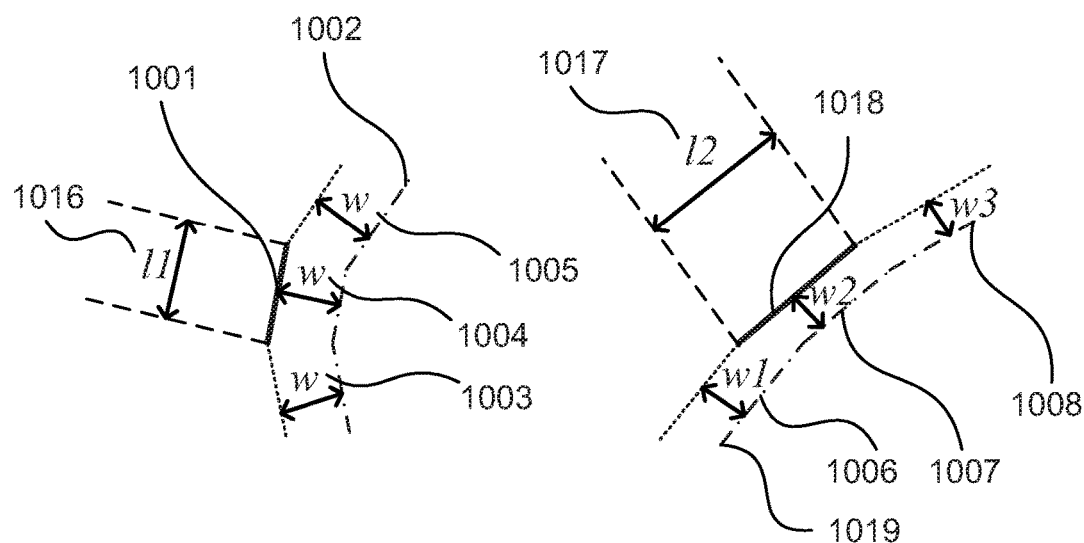
Fig. 10A      Fig. 10B
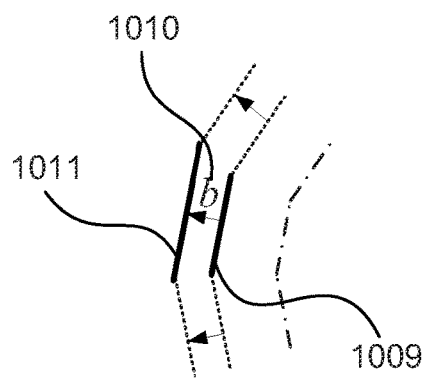 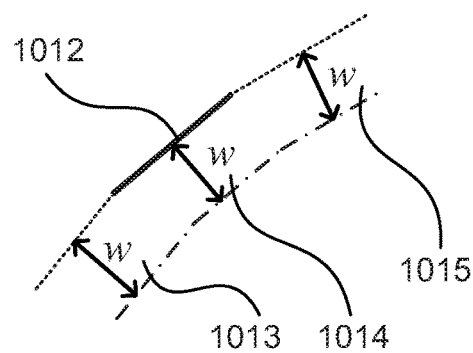
Fig. 10C      Fig. 10D

METHOD, SYSTEM AND APPARATUS FOR MODIFYING A FONT CHARACTER

CROSS-REFERENCE TO RELATED APPLICATIONS

This application claims the benefit under 35 U.S.C. § 119 of the filing date of Australian Patent Application No. 2015268723, filed Dec. 15, 2015, hereby incorporated by reference in its entirety as if fully set forth herein.

TECHNICAL FIELD

The present invention relates to computer fonts, in particular to ensuring consistent weight of strokes. The present invention also relates to a method and apparatus for modifying a font character, and to a computer program product including a computer readable medium having recorded thereon a computer program for modifying a font character.

BACKGROUND

Fonts used in computers may be representable using a vector description describing the outline of a character shape. Fonts are generally grouped together into a collection of fonts known as a font family. The fonts within the font family are related in its design but with some variation applied. Example variations that are common include bold, italic and bold italic variations. Typically, each font variation is created by a human font designer and separate font files for each variation are produced. Often a master font without any variations is the regular font.

Typically when displayed text requires emphasis, it is not uncommon to utilise an alternative font style such as italics to display text. For example, when using HTML for marking up text to be displayed within web-browsers, the <em> tag is used to emphasise text styled in the italic font variation. An italic font style typically slants slightly to the right and may contain cursive letterforms. Another stylistic form that is often used either as a substitute or the starting design for italic fonts is the oblique style which features only a right slant without the cursive letterforms that are present for lower-case characters.

FIGS. 2A and 2B show an example of shear transformation that is often utilised to automatically produce oblique fonts. FIG. 2A shows an example uppercase character "T" 201 in regular style (non-oblique). Shown around the character 201 is a rectangular box 202 to illustrate the change to the bounds of shapes as a result of an oblique transformation. FIG. 2B shows an oblique variant of the character 201 shown in FIG. 2A produced using shear transformation. The sheared character "T" 203 is shown slanted to the right in FIG. 2B, with the surrounding rectangular box 202 being transformed to produce a parallelogram 204. In the example of FIG. 2B, the left edge 207 and right edge 204 of the parallelogram are slanted by the slant angle $\phi$205 relative to the vertical axis 206. While the typical shear transformation achieves the purpose of producing a slanted font, performing slanting alone results in stroke widths being inadvertently modified.

An outline definition 301 for the character 201 of FIG. 2A is shown in FIG. 3A. The width of the vertical stroke 302 of the character "T" 201, which is denoted as w, corresponds to the perpendicular distance between the two vertical edges. Upon applying a slant transformation, to produce slanted outline definition 303 as shown in FIG. 3B, measured horizontal distance 304 is preserved by the slant transformation with a value of w. However, the correct stroke width is perpendicular distance 305, which is denoted as wp. As seen in FIG. 3B, stroke width wp is different to stroke width w.

Similarly, when a slant operation is applied to other characters which feature curves, such as character 400 shown in FIGS. 4A and 4B, a change in stroke width results. FIG. 4A is the lowercase character "o" 400 composed of an outer circle 401 and an inner circle 402. Measurements made between the outer and inner circles 401 and 402 respectively produce a stroke width of w at positions 403 and 404 shown in FIG. 4A. However, after slanting character 400, a resultant outline 410 shown in FIG. 4B comprises slanted outer curve 405 and inner curve 406.

As seen in FIG. 4B, when performing measurements of features similar to that at positions 403 and 404 but situated in the slanted outline 410 width value w1 at position 407 is different to width value w2, In particular, it can be determined that w1>w and w2<w.

FIG. 5 shows two possible candidates for a slanted character generated for the letter "o". An ideal transformation should result in an outer curve 501 and an inner curve 502 as shown in FIG. 5 where stroke width is consistent between the two curves 501 and 502. However, a typical shear transformation results in outer curve 503 and inner curve 504 having inconsistent stroke widths. The creation of italic fonts often requires corrections to be applied to produce results similar to curves 503 and 504 resulting from a slant transformation. Such transformations become more complicated for fonts designed with variable stroke weights.

Thus, a need exists for a method of producing oblique characters that preserve parameters used to author fonts.

SUMMARY

It is an object of the present invention to substantially overcome, or at least ameliorate, one or more disadvantages of existing arrangements.

According to a first aspect of the present disclosure, there is provided a method of modifying a font character, the method comprising:

receiving an outline of the font character, the outline being a vector representation of the character, receiving a slant angle parameter to be applied to the font outline, the slant angle specifying an amount of shearing to be applied to the font outline;

determining a modified stroke width for each segment of the font outline according to an initial angle of the segment and the slant angle, the modified stroke width being proportional to ratio of a length of the segment before and after applying the slant angle to the outline, wherein the modified stroke width is used for adjusting an initial stroke width of the segment to compensate for changes to stroke width of the segment caused by applying the slant angle; and rendering the font character using the modified stroke width of the segments.

According to another aspect of the present disclosure, there is provided a system for modifying a font character, the system comprising:

a memory for storing data and a computer program;

a processor coupled to the memory for executing the computer program, the computer program comprising instructions for:

receiving an outline of the font character, the outline being a vector representation of the character;

receiving a slant angle parameter to be applied to the font outline, the slant angle specifying an amount of shearing to be applied to the font outline;

determining a modified stroke width for each segment of the font outline according to an initial angle of the segment and the slant angle, the modified stroke width being proportional to ratio of a length of the segment before and after applying the slant angle to the outline, wherein the modified stroke width is used for adjusting an initial stroke width of the segment to compensate for changes to stroke width of the segment caused by applying the slant angle; and rendering the font character using the modified stroke width of the segments.

According to another aspect of the present disclosure, there is provided an apparatus for modifying a font character, the apparatus comprising:

means for receiving an outline of the font character, the outline being a vector representation of the character;

means for receiving a slant angle parameter to be applied to the font outline, the slant angle specifying an amount of shearing to be applied to the font outline;

means for determining a modified stroke width for each segment of the font outline according to an initial angle of the segment and the slant angle, the modified stroke width being proportional to ratio of a length of the segment before and after applying the slant angle to the outline, wherein the modified stroke width is used for adjusting an initial stroke width of the segment to compensate for changes to stroke width of the segment caused by applying the slant angle; and means for rendering the font character using the modified stroke width of the segments.

According to another aspect of the present disclosure, there is provided a non-transitory computer readable medium having a computer program stored on the medium for modifying a font character, the program comprising:

code for receiving an outline of the font character, the outline being a vector representation of the character;

code for receiving a slant angle parameter to be applied to the font outline, the slant angle specifying an amount of shearing to be applied to the font outline;

code for determining a modified stroke width for each segment of the font outline according to an initial angle of the segment and the slant angle, the modified stroke width being proportional to ratio of a length of the segment before and after applying the slant angle to the outline, wherein the modified stroke width is used for adjusting an initial stroke width of the segment to compensate for changes to stroke width of the segment caused by applying the slant angle; and code for rendering the font character using the modified stroke width of the segments.

According to another aspect of the present disclosure, there is provided a method of rendering a font character, the method comprising:

receiving an outline of the font character, the outline being a vector representation of the character;

receiving a slant angle parameter to be applied to the outline, the slant angle specifying an amount of shearing;

modifying the outline by adjusting initial stroke widths of the outline based on any changes in stroke width caused by applying the slant angle to the outline;

applying a shearing transformation to the modified outline using the slant angle; and rendering the sheared outline to render the font character using the adjusted stroke widths.

According to another aspect of the present disclosure, there is provided a system for rendering a font character, the system comprising:

a memory for storing data and a computer program;

a processor coupled to the memory for executing the computer program, the computer program comprising instructions for:

receiving an outline of the font character, the outline being a vector representation of the character, receiving a slant angle parameter to be applied to the outline, the slant angle specifying an amount of shearing to be applied to the outline description;

modifying the outline by adjusting initial stroke widths of the outline based on any changes in stroke width caused by applying the slant angle to the outline;

applying a shearing transformation to the modified outline using the slant angle; and rendering the sheared outline to render the font character using the adjusted stroke widths.

According to another aspect of the present disclosure, there is provided an apparatus for rendering a font character, the apparatus comprising:

means for receiving an outline of the font character, the outline being a vector representation of the character;

means for receiving a slant angle parameter to be applied to the outline, the slant angle specifying an amount of shearing to be applied to the outline description;

means for modifying the outline by adjusting initial stroke widths of the outline based on any changes in stroke width caused by applying the slant angle to the outline:

means for applying a shearing transformation to the modified outline using the slant angle; and means for rendering the sheared outline to render the font character using the adjusted stroke widths.

According to another aspect of the present disclosure, there is provided a non-transitory computer readable medium having a computer program stored on the medium for rendering a font character, the program comprising:

code for receiving an outline of the font character, the outline being a vector representation of the character;

code for receiving a slant angle parameter to be applied to the outline, the slant angle specifying an amount of shearing to be applied to the outline description;

code for modifying the outline by adjusting initial stroke widths of the outline based on any changes in stroke width caused by applying the slant angle to the outline:

code for applying a shearing transformation to the modified outline using the slant angle; and code for rendering the sheared outline to render the font character using the adjusted stroke widths.

Other aspects are also disclosed.

BRIEF DESCRIPTION OF THE DRAWINGS

One or more embodiments of the invention will now be described with reference to the following drawings, in which:

FIG. 10A shows an example of a sequence of edges of an outline before being subjected to a shearing operation;

FIG. 10B shows the set of corresponding edges of FIG. 10A with shearing applied to the edges;

FIG. 10C shows a set of edges resulting from an emboldening step performed on one of the edges;

FIG. 10D shows the result of performing a shearing operation on the set of edges from FIG. 10C to produce sheared edges while preserving the stroke width;

DETAILED DESCRIPTION INCLUDING BEST MODE

Disclosed are arrangements relating to computer fonts and, in particular, to ensuring consistent weight of strokes, when an oblique form of a computer font is produced. As described below, the computer fonts are represented in a scalable vector representation of the outline. The disclosed arrangements seek to alleviate the problem of stroke width modification caused by shearing of text.

The disclosed arrangements improve oblique fonts which either decrease the need for italic font files or produce an improved starting representation from which to make italic fonts.

Figure 6:
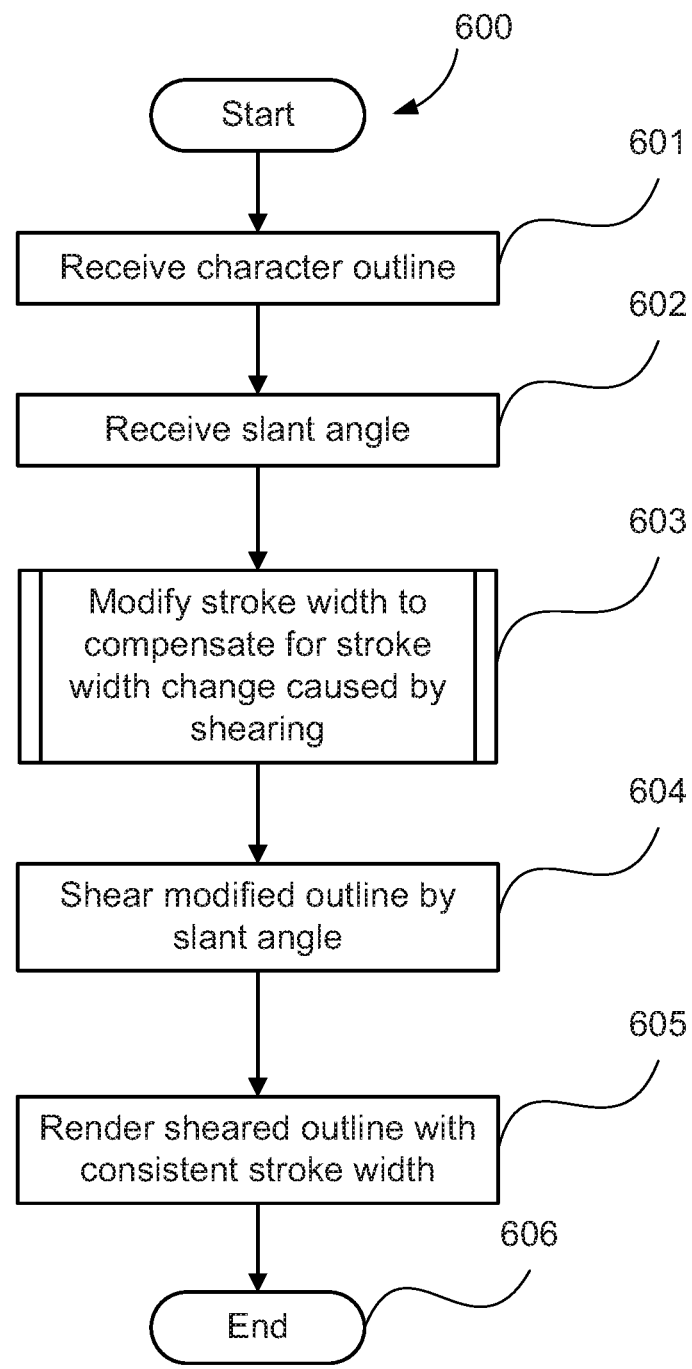
FIG. 6 is a schematic flow diagram showing a method of rendering a character.

FIG. 6 is a flow diagram showing a method 600 of rendering a font character. The method 600 preserves stroke widths of the character.

Figure 1A:
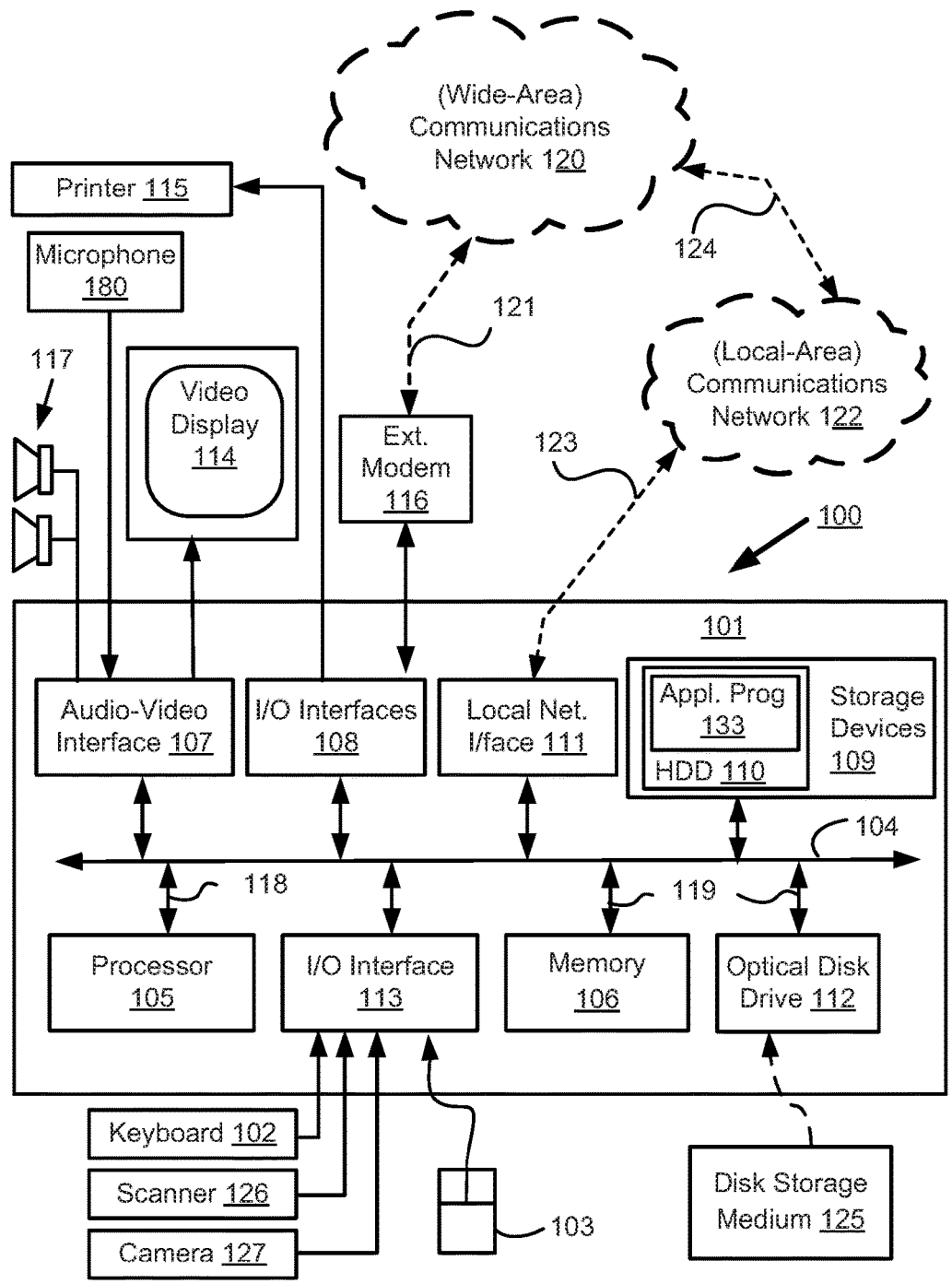
FIGS. 1A and 1B collectively form a schematic block diagram of a general purpose computer with which the described arrangements may be practised.
Figure 1B:
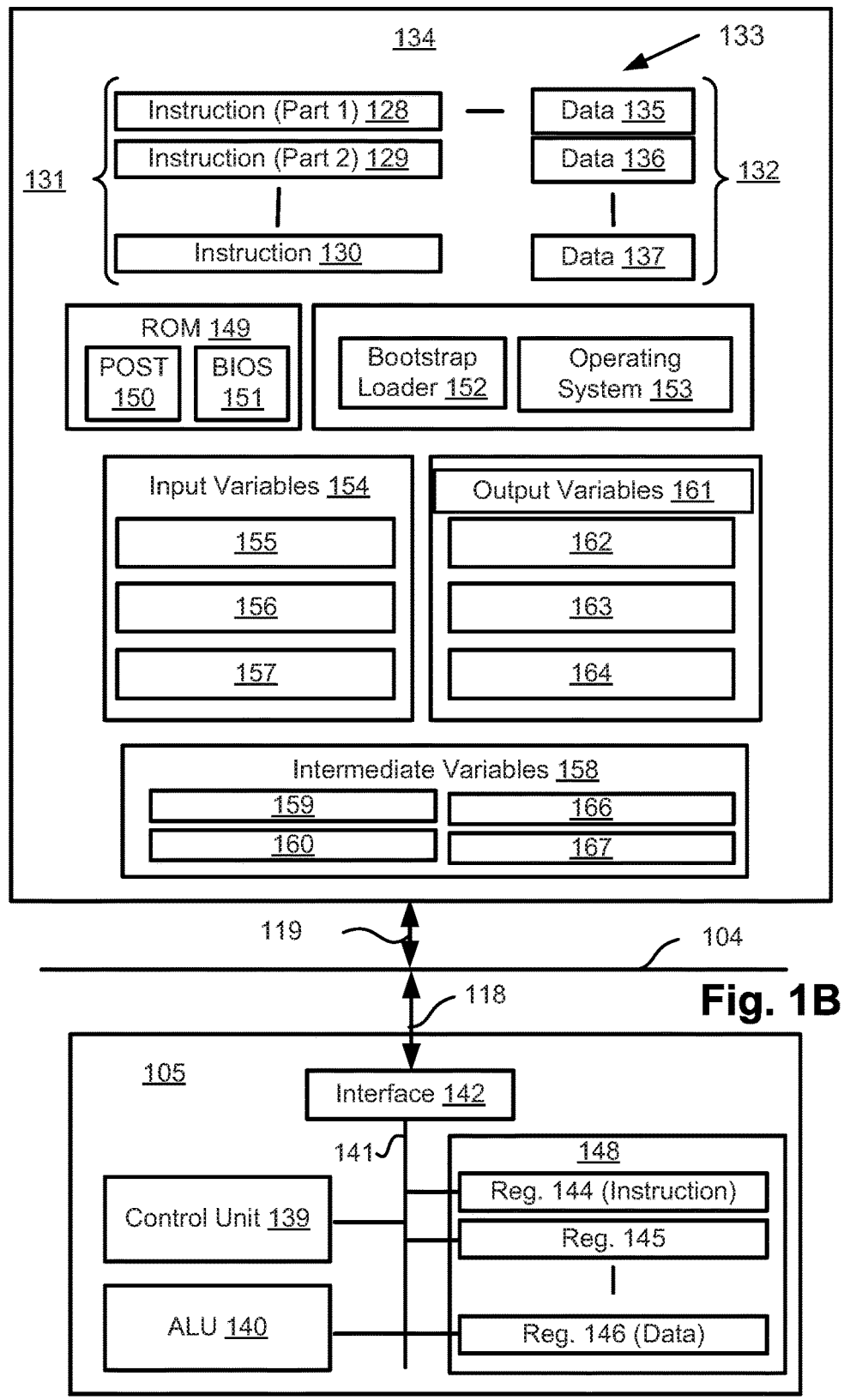

FIGS. 1A and 1B depict a general-purpose computer system 100, upon which the method 600 and other methods described below can be practiced.

As seen in FIG. 1A, the computer system 100 includes: a computer module 101; input devices such as a keyboard 102, a mouse pointer device 103, a scanner 126, a camera 127, and a microphone 180; and output devices including a printer 115, a display device 114 and loudspeakers 117. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes an number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1A, the local communications network 122 may also couple to the wide network 120 via a connection 124, which would typically include a so-called "firewall" device or device of similar functionality. The local network interface 111 may comprise an Ethernet circuit card, a Bluetooth® wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or a like computer systems.

The described methods may be implemented using the computer system 100 wherein the processes of FIGS. 6 to 13 to be described, may be implemented as one or more software application programs 133 executable within the computer system 100. In particular, the steps of the described methods are effected by instructions 131 (see FIG. 1B) in the software 133 that are carried out within the computer system 100. The software instructions 131 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 133 is typically stored in the HDD 110 or the memory 106. The software is loaded into the computer system 100 from the computer readable medium, and then executed by the computer system 100. Thus, for example, the software 133 may be stored on an optically readable disk storage medium (e.g., CD-ROM) 125 that is read by the optical disk drive 112. A computer readable medium having such software or computer program recorded on the computer readable medium is a computer program product. The use of the computer program product in the computer system 100 preferably effects an advantageous apparatus for implementing the described methods.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106 of FIG. 1A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1A must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 1B, the processor 105 includes a number of functional modules including a control unit 139, an arithmetic logic unit (ALU) 140, and a local or internal memory 148, sometimes called a cache memory. The cache memory 148 typically include a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 1105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1A. The execution of a set of the instructions may in some cases result in output of data. Execution may also involve storing data or variables to the memory 134.

The disclosed arrangements use input variables 154, which are stored in the memory 134 in corresponding memory locations 155, 156, 157. The disclosed arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 1B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

a fetch operation, which fetches or reads an instruction 131 from a memory location 128, 129, 130;

a decode operation in which the control unit 139 determines which instruction has been fetched; and an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Figure 7:
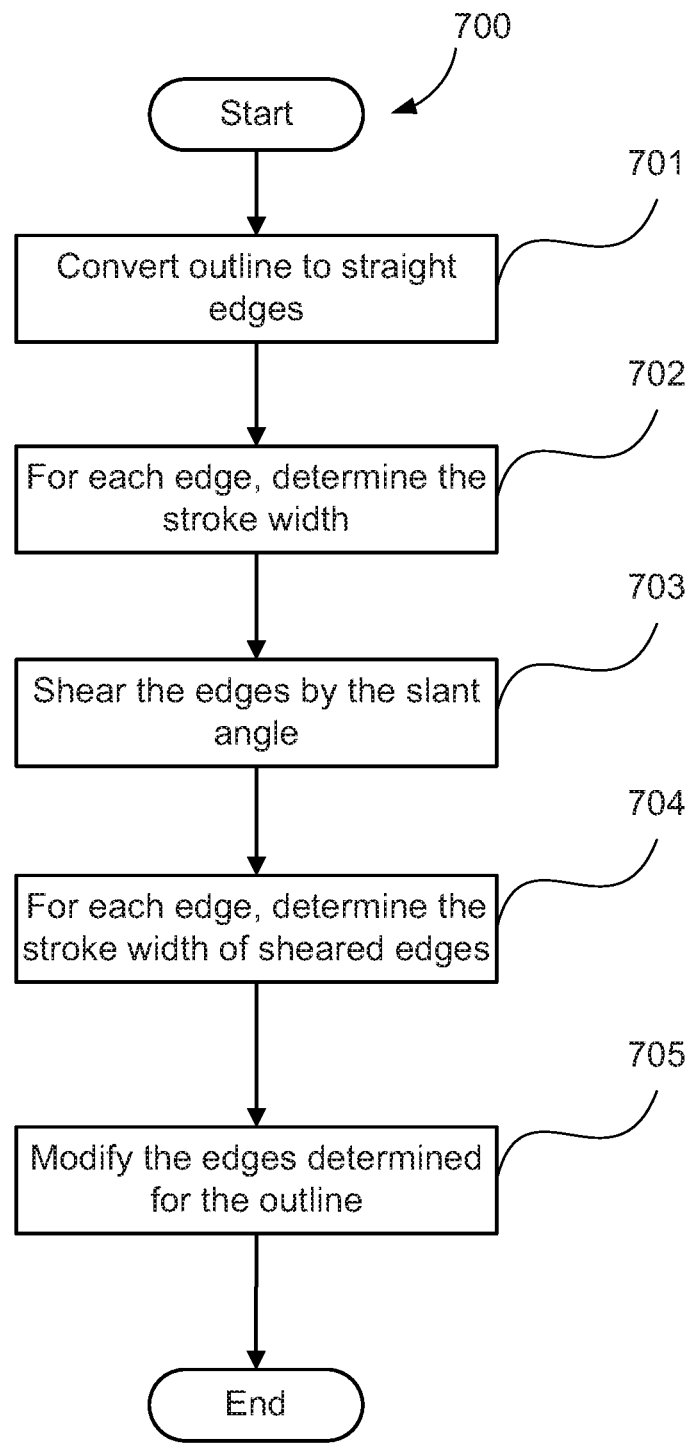
FIG. 7 is a schematic flow diagram showing a method of modifying a character outline.

Each step or sub-process in the processes of FIGS. 6 and 7 is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The described methods may alternatively be implemented in dedicated hardware such as one or more integrated circuits performing the functions or sub functions of the described methods. Such dedicated hardware may include graphic processors, digital signal processors, or one or more microprocessors and associated memories.

The method 600 may be implemented as one or more code modules of the software application program 133 resident on the hard disk drive 110 and being controlled in its execution by the processor 105.

The method 600 of rendering the font character commences at outline description receiving step 601, where a description of the outline of a shape representing the font character is received under execution of the processor 105, the outline being a vector representation of the character. The outline description of the character may be stored in the memory 106. A vector representation is scalable and may be said to be describing the outline using a set of vectors. In one arrangement, the vector representation may be retrieved at step 601 from the memory 106 under execution of the processor 105.

Continuing onto angle receiving step 602, a slant angle parameter representing the slant angle to be applied to the font character outline description is received under execution of the processor 105. The slant angle is used to adjust the amount of slant required to produce an oblique style for the character, by specifying an amount of shearing to be applied to the character outline. The slant angle may be stored in the memory 106. In one arrangement, the slant angle may be retrieved at step 602 from the memory 106 under execution of the processor 105.

Then at modifying step 603, the character outline description received at step 601 is modified. The character outline is modified at step 603 by adjusting initial stroke widths of the character outline to compensate for any changes in stroke width caused by applying the slant angle to the character outline at step 602. As described below, a modified stroke width is determined for each edge of the font character outline description according to an initial angle of the edge and the slant angle.

A method 700 of modifying the character outline description for the font character, as executed at step 603, will be described in detail below with reference to FIG. 7. A method 1200 of modifying the character outline description, which may alternatively be executed at step 603, will be described in detail below with reference to FIG. 12.

Continuing onto shearing step 604, the character description with modified stroke width is subjected to a shearing transformation using the slant angle retrieved at step 602. Step 604 produces a character outline description that features consistent stroke width while being slanted.

Then at rendering step 605, the sheared outline is rendered using the modified stroke widths determined at step 604, under execution of the processor 105, to render the character represented by the sheared outline. The sheared outline is rendered with consistent stroke width.

Figure 2A:
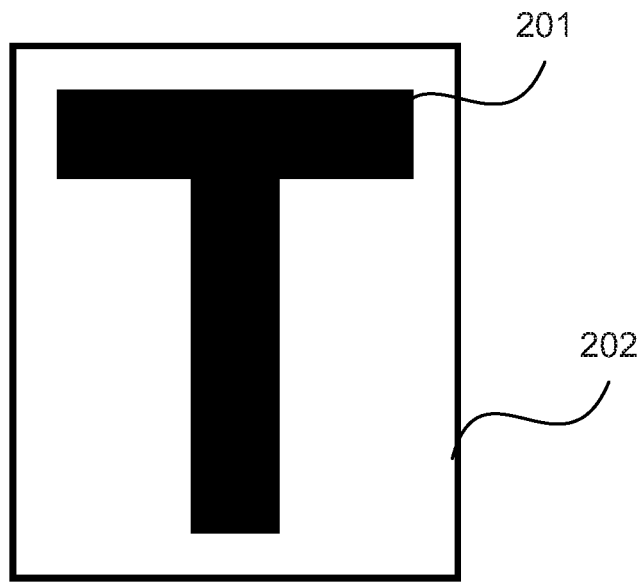
FIG. 2A shows an example uppercase character in regular style.
Figure 2B:
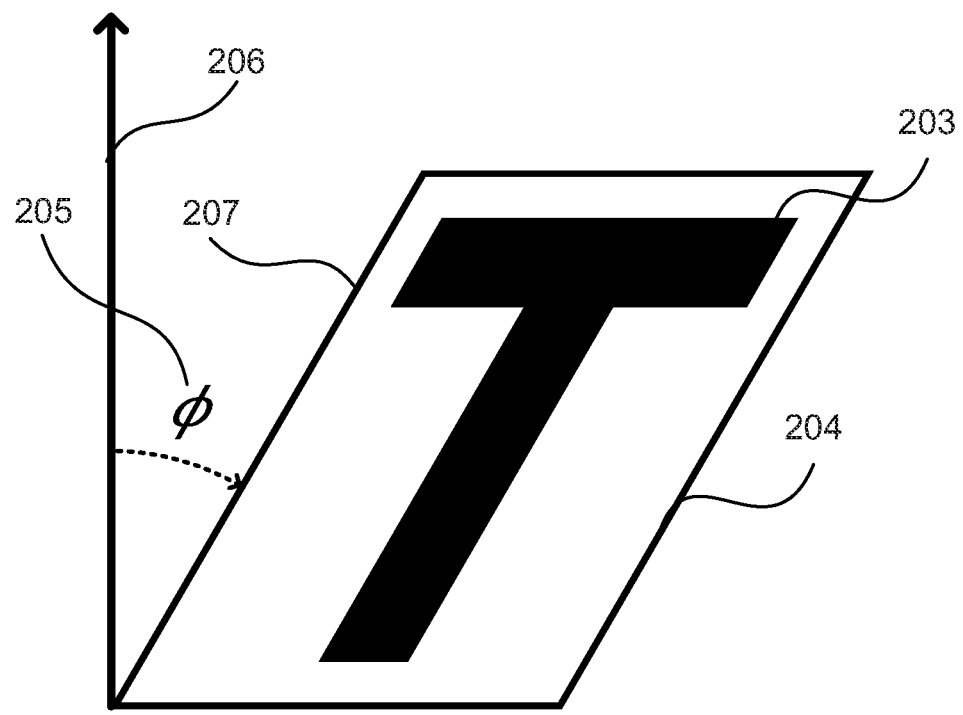
FIG. 2B shows an oblique variant of the character shown in FIG. 2A produced using shear transformation.

The shearing step as described in step 604 is the process of applying the shearing transform to each control point in the character outline. The shearing transformation modifies the control points expressed in the co-ordinates (x, y) and repositions the character outline to a point (x+λy, y), where the value λ is a term that is related to the slant angle which was previously shown as 205 in FIG. 2B. More specifically, the slanting operation may be expressed as $\lambda = \tan \phi$.

The method 700 of modifying the character outline description, as executed at step 603, will now be described with reference to FIG. 7.

The method 700 may be implemented as one or more code modules of the software application program 133 resident on the hard disk drive 110 and being controlled in its execution by the processor 105.

The method 700 begins by converting the outline received at step 601 to straight edges at converting step 701. The converted outline may be stored in the memory 106 by the processor 105. The conversion of the character outline definition at step 701 will be described in more detail below.

Then in determining step 702, the width of the strokes forming the character is determined for each edge of the character to be rendered, under execution of the processor 105. The width of the strokes is determined by measuring the perpendicular distance between the edges forming the strokes. Other methods of stroke width measurements may also be performed at step 702, including determining the distance between edges at the same angle of intersection. The angle of intersection may be predetermined. The stroke widths determined at step 702 may be stored in the memory 106. The determination of the stroke widths at step 702 will be described in more detail below.

At shearing step 703, the edges forming the outline of the character are then sheared by the slant angle received at step 602, under execution of the processor 105. The shearing of the edges forming the outline of the character at step 703, will be described in further detail below.

As the shearing process performed at step 703 modifies the stroke widths, at stroke width determining step 704, the stroke width for each sheared edge is determined for the sheared edges, under execution of the processor 105, to produce sheared stroke widths. The sheared stroke widths may be stored in the memory 106.

At modifying step 705, the edges determined for the outline of the character at step 701 are modified. The edges are modified by performing a stroke emboldening process on the edges under execution of the processor 105. The stroke emboldening process is performed using the original stroke width values determined at step 702 and the sheared stroke width values determined at step 704. For each edge of the outline, an emboldening amount inversely proportional to the change in edge width is determined. The emboldening of edges as performed at step 705 will be described in further detail below.

The conversion of the character outline definition at step 701 of FIG. 7 may be performed using various methods. In one arrangement, the outline definition may be represented as a set of control points forming an enclosed region where edges are formed between the control points. In an arrangement where the outline definition is formed entirely by straight line connections between a sequence of control points, the straight line connections form the edges that are used for the determination of the emboldening amounts at step 705.

Figure 8A:
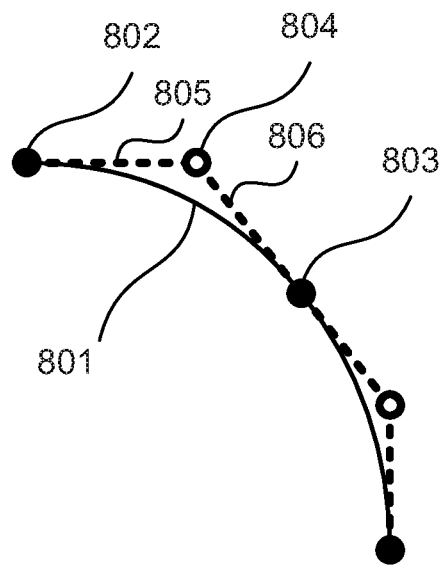
FIG. 8A shows an example of a Quadratic Bezier curve segment that may be used to define a character outline.

In another representation, the outline definition may be defined using a format known as Bezier control points, where the outline definition is formed by a set of control points that may be classed as on-curve control points and off-curve control points. For example, FIG. 8A is an example of a Quadratic Bezier curve segment that may be used to define a character outline, where the curve 801 passes through the on-curve control points 802 and 803, and the curvature is modified by the off-curve control point 804.

For an arrangement using Bezier control points, rather than vectorising the curves, the process of emboldening line segments are considered between the control points. In the example of FIG. 8A, an edge 805 is formed between control on-curve control point 802 and off-curve control point 804 and an edge 806 is formed between off-curve control point 804 and on-curve control point 803. The processing then does not make distinctions between off-curve and on-curve control points and the processing is performed using the newly formed edges such as edges 805 and 806.

Figure 8B:
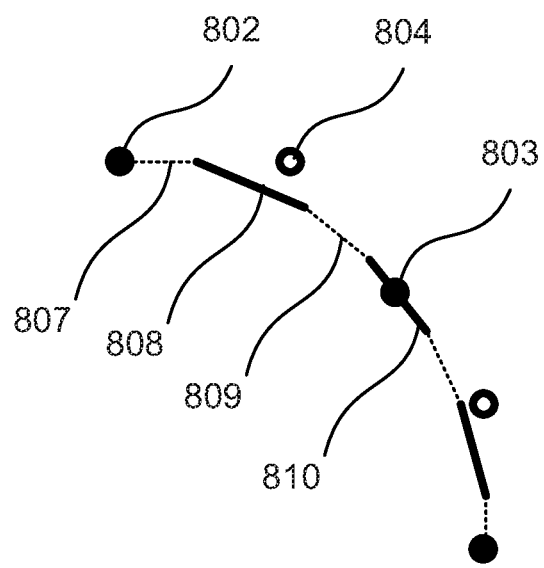
FIG. 8B shows a vectorisation of the curve of FIG. 8A.

Another method of converting the character outline definition at step 701 to edges is to convert the curves to straight lines by converting the character outline to a vectorised form. In a vectorised form of a curve, the curve segments are converted into a sequence of straight line segments which approximate the curve where the accuracy of the approximation depends on the length of the straight line segments. For example, when the straight line segments are of a pixel in length, the rendering of the approximation has no perceivable errors. FIG. 8B shows an example vectorisation of the curve 801 shown in FIG. 8A. In FIG. 8B, the same control points defining curve 801 are shown with on-curve control points 802 and 803, and an off-curve control point 804. To approximate the curve 801, a sequence of straight edges 807, 808, 809 and 810 are produced. The edges 807, 808, 809 and 810 are produced to pass through on-curve control points 802 and 803 and appear to have a shape similar to curve 801 shown in FIG. 8A. While the example of FIG. 8B demonstrates the approximation of the Bezier curve 801, other curve types such as splines may be converted to edges in a similar manner. The processing of the stroke width correction may then be performed using the vectorised edges.

When processing the edges of a character outline, a minimal set of edges may be used to ensure efficient performance. When vectorisation is utilised, the length of the edges may be decided such that quality is acceptable while ensuring good performance. Using the on-curve and off-curve control point positions to form the edges of a character outline provides good performance as it allows a reduction in the edges generated without impacting performance.

The methods described above use a character outline definition defining the boundaries of the character shapes in a scalar form (as opposed to raster form). However, other scalar forms that may be approximated using straight edges, as processed at step 701 of FIG. 7, may be used in the described methods. In arrangements using such other scalar forms, the method 700 allows for the correction of stroke weights.

Figure 3A:
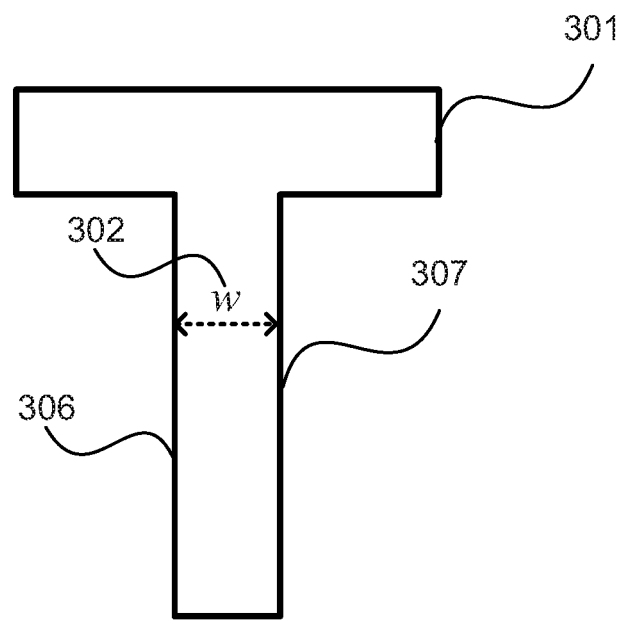
FIG. 3A shows an outline definition for the character of FIG. 2A.
Figure 3B:
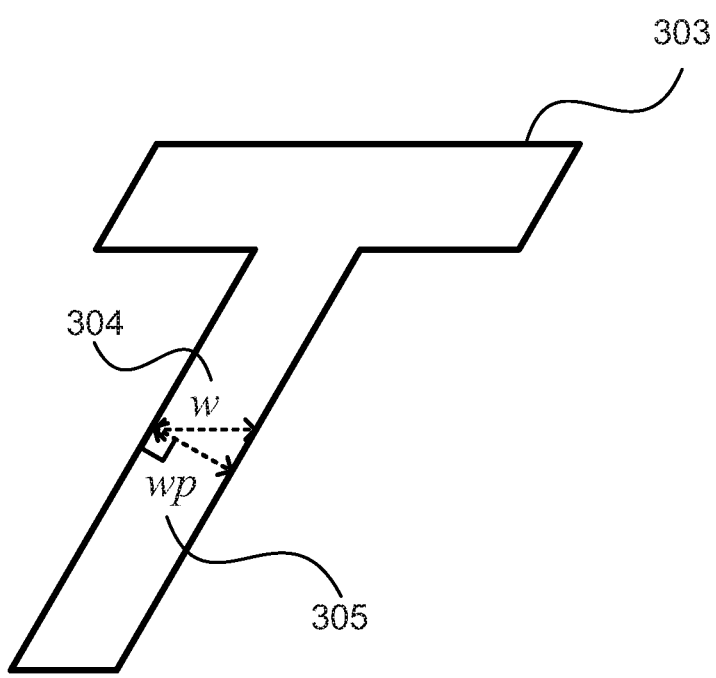
FIG. 3B shows the outline of FIG. 3A after a slant transformation has been applied to the outline definition.

The determination of stroke width as described as step 702 in FIG. 7 is performed at each edge forming the strokes and is also performed at step 704 on the sheared edges. Characters are predominately composed of strokes which are composed of edge pairs. For example, in the example character "T" shown in FIG. 3A, the stroke width determination is performed on the vertical stem 302 to produce a width value of w, which is performed by measuring the distance between the two edges 306 and 307 which collectively form the stroke. Typically the angle of the measurement line with the edges is often orthogonal (i.e. at 90 degrees).

Figure 4A:
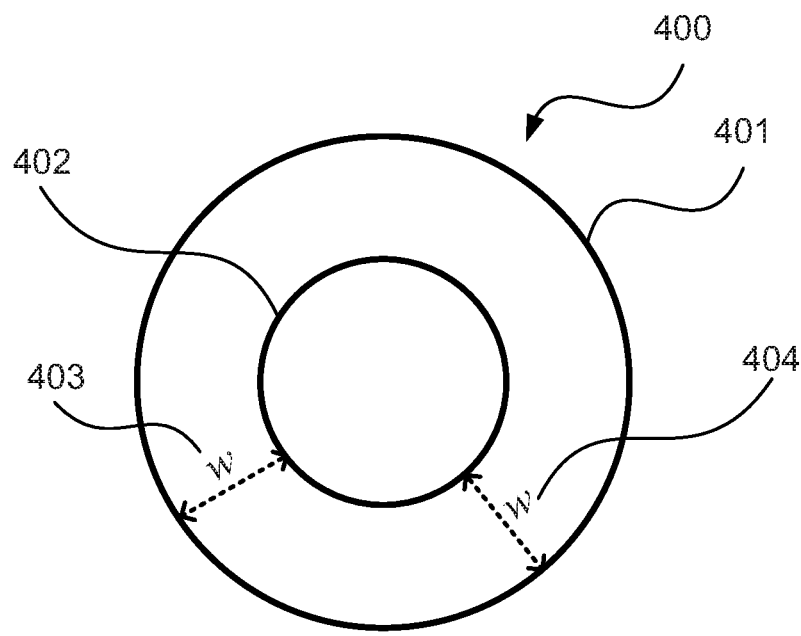
FIG. 4A shows a lowercase character "o" composed of an outer circle and an inner circle.
Figure 4B:
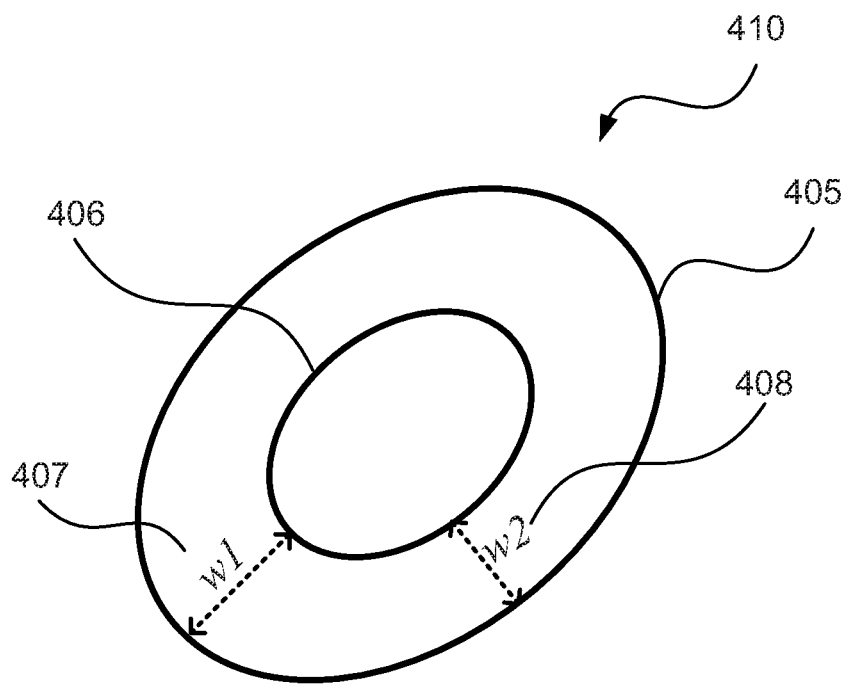
FIG. 4B shows the character of FIG. 4A after a slant transformation has been applied to the character of FIG. 4A.
Figure 5:
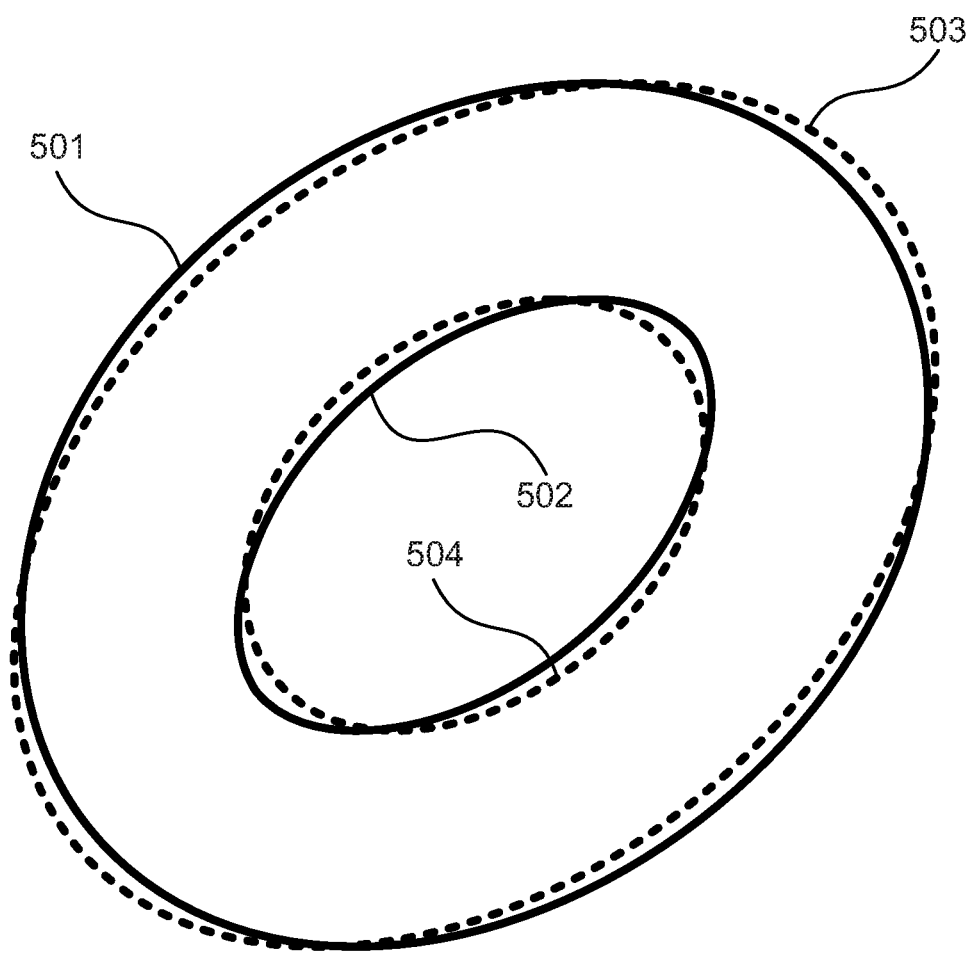
FIG. 5 is a diagram showing skewing of a lower case character "o" with an overlay of an italic lower case "o" with correct stroke width.
Figure 9A:
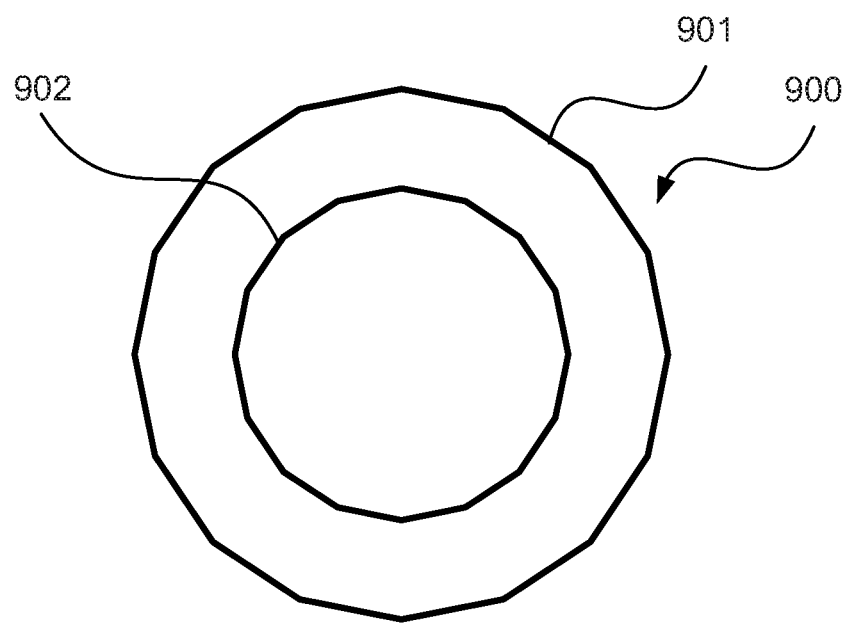
FIG. 9A shows an example of the lower case letter "o" of FIG. 4A, where an outer curve is represented by an outer sequence of edges and an inner curve is represented by an inner sequence of edges.
Figure 9B:
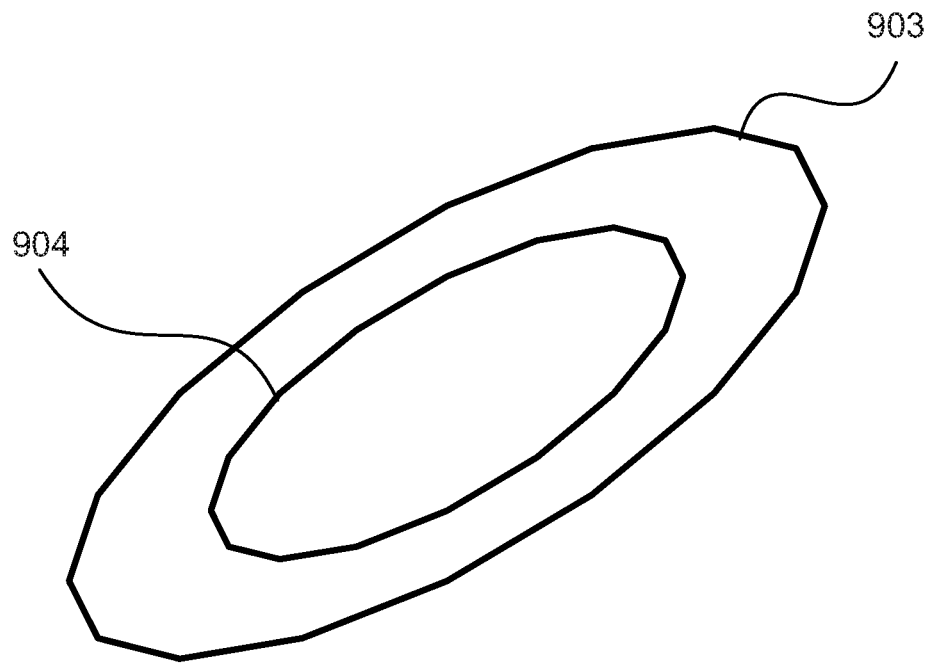
FIG. 9B shows the result of shearing the edges of the character of FIG. 9A.

The shearing of the edges forming the outline of the character may be performed by shearing of the edges produced from the outline at step 703. FIG. 9A is an example of the lower case letter "o" 400 of FIG. 4A, where the outer curve 401 is represented by an outer sequence of edges 901 and the inner curve 402 is represented by an inner sequence of edges 902. The outer sequence of edges 901 and inner sequence of edges 902 form character 900. FIG. 9B shows the edges 901 and 902 after shearing has been applied to the edges 901 and 902 to form sheared edges 903 and 904.

The emboldening of edges is performed at step 705 by determining the width of the strokes before shearing and after shearing in order to determine the amount of change in the stroke width. Once the amount of change in the stroke width is determined, the change in stroke width caused by the shearing transformation may be compensated for in order to produce a character with consistent stroke width. FIG. 10A shows an example of a sequence of edges of an outline before being subjected to a shearing operation, where an outer sequence of edges 1001 is of a known distance w from a inner sequence of edges 1002. Shown in the FIG. 10A are measured stroke widths 1003, 1004 and 1005 for the outer edges which are of a fixed distance w from the inner edge sequence 1002.

FIG. 10B shows the set of edges 1001 and 1002 of FIG. 10A with shearing applied to the edges so that the stroke widths are modified as a result of the shearing. Shown in FIG. 10B are the measured stroke widths corresponding to positions shown in FIG. 10A as 1003, 1004 and 1005, subjected to skewing and now having widths w1 1006, w2 1007 and w3 1008, which are different to the original stroke width value w. For the configuration of the edges 1001 and 1002 shown in FIG. 10A, the sheared edges 1018 and 1019 of FIG. 10B have become more horizontal and therefore have a width that is reduced resulting in the following w>w1>w2>w3. The change in stroke thickness for the widths 1003, 1004 and 1005 can be represented as a ratio w1/w, w2/w and w3/w respectively.

In order to compensate for the changes in width caused by shearing, edge 1001 may be repositioned such that the resultant edge will be a distance of w from an opposite edge. In one arrangement, an emboldening step may be applied to each edge of a path in order to thicken the strokes and compensate for the reduction in the stroke caused by shearing.

FIG. 10C shows an example of an emboldening step that is performed on edges with stroke width modification, where edge 1009 is repositioned at a distance b at a direction normal to the edge 1009, forming an emboldened edge 1011.

FIG. 10D shows the result of performing a similar shearing operation on the set of edges 1011 and 1009 from FIG. 10C. The emboldened edge 1011 from FIG. 10C is subjected to shearing thereby producing resultant emboldening sheared edge 1012. The sheared edge 1012 has a stroke width w 1014 which is similar to the stroke width of the original set of edges 1001 and 1002 in FIG. 10A. Similarly, for the measured stroke widths 1003, 1004 and 1005, sheared equivalent edges in FIG. 10D have stroke widths at positions 1013, 1014 and 1015 which are all equal to stroke width w. The stroke width w of FIG. 10C is preserved in the set of edges shown in FIG. 10D.

The steps described with reference to FIG. 10A, FIG. 10C and FIG. 10D are the steps that are taken in order to produce a sheared result with similar stroke widths as an original regular character corresponding to the edges, for example, of FIG. 10A.

The edge emboldening described above requires different amounts of emboldening to be applied to each edge forming a character. The emboldening performed in accordance with the described methods allows emboldening to be applied to each edge as a ratio of the width of the stroke to allow for optically optimal results.

Figure 11A:
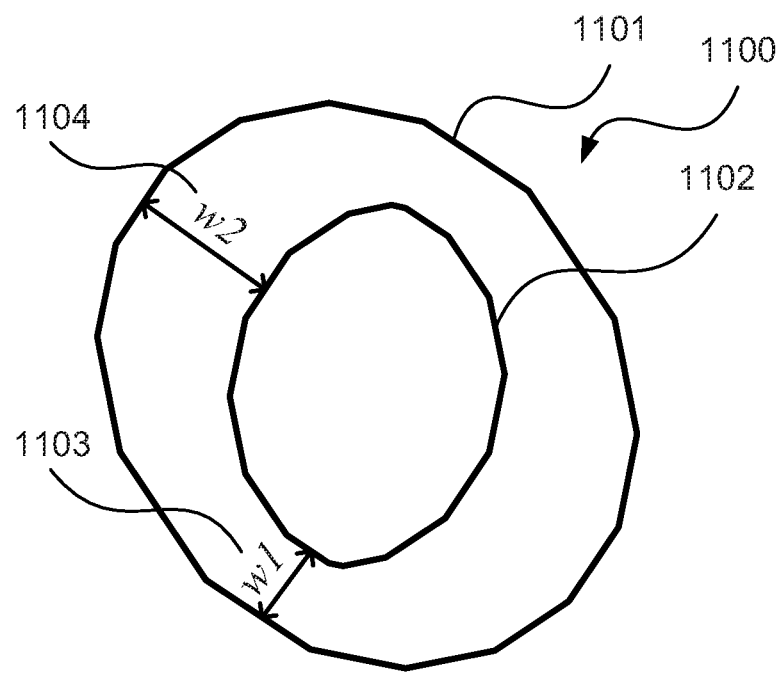
FIGS. 11A and 11B are diagrams showing the edges for lower case "o" being emboldened and the effect of shearing on the emboldened edges.

FIG. 11A shows a set of sheared edges 1100 corresponding to the set of edges describing the lower case character "o" 900 in FIG. 9A, following the emboldening of step 603 being applied to the set of edges describing the character 900 of FIG. 9A. In the example of FIG. 11A, the outer sequence of edges 901 approximating a circle with an inner sequence of edges 902 also approximating a circle, has been transformed to an irregular sequence of edges 1101 and 1102 that is not circular in shape. As seen in FIG. 11A, the distance (or measured stroke between the outer sequence of edges 1101 and inner sequence of edges 1102) is not uniform. For example, one edge stroke measurement has a width of w1 1103, whereas a different edge has a width w2 1104, where relationship between the stroke widths is w1<w<w2.

Figure 11B:
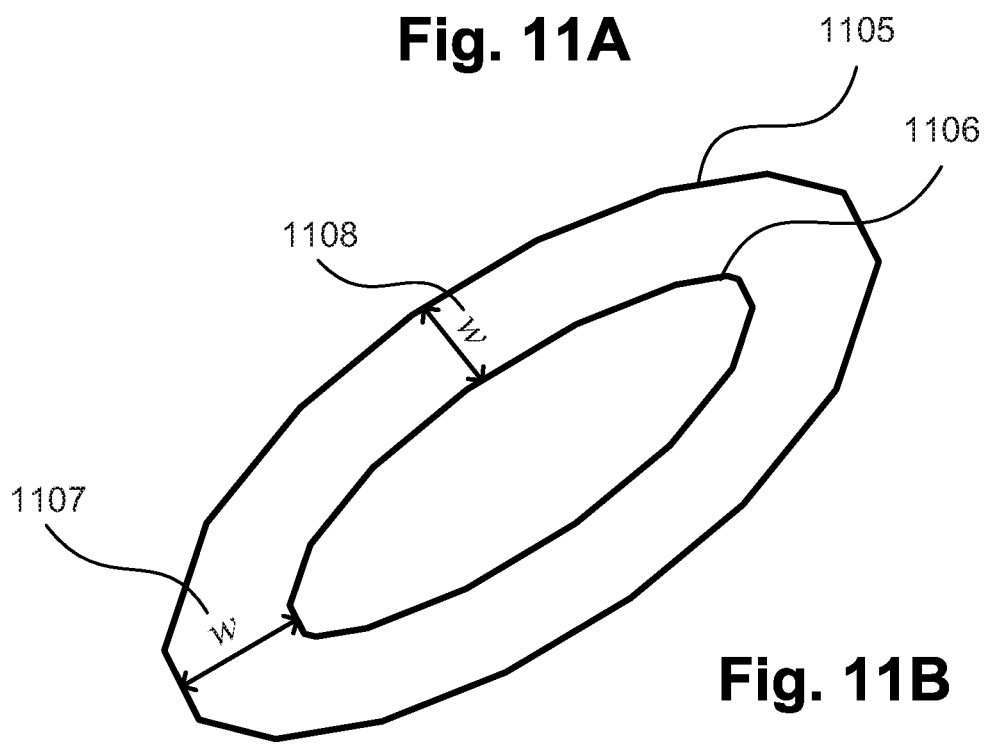

FIG. 11B shows the emboldening edges 1101 and 1102 shown in FIG. 11A after shearing has been applied to the edges 1101 and 1102 to form an outer sequence of edges 1105 and inner sequence of edges 1106. In FIG. 11B, the outer sequence of edges 1105 and inner sequence of edges 1106 are now positioned such that the stroke width is consistently w 1107 and 1108. As seen in FIG. 11B, by deforming the regular style path using non-uniform emboldening on edges, the resulting set of sheared edges 1105 and 1106 produces an output where the stroke widths are similar to that of the character in the regular style.

Figure 12:
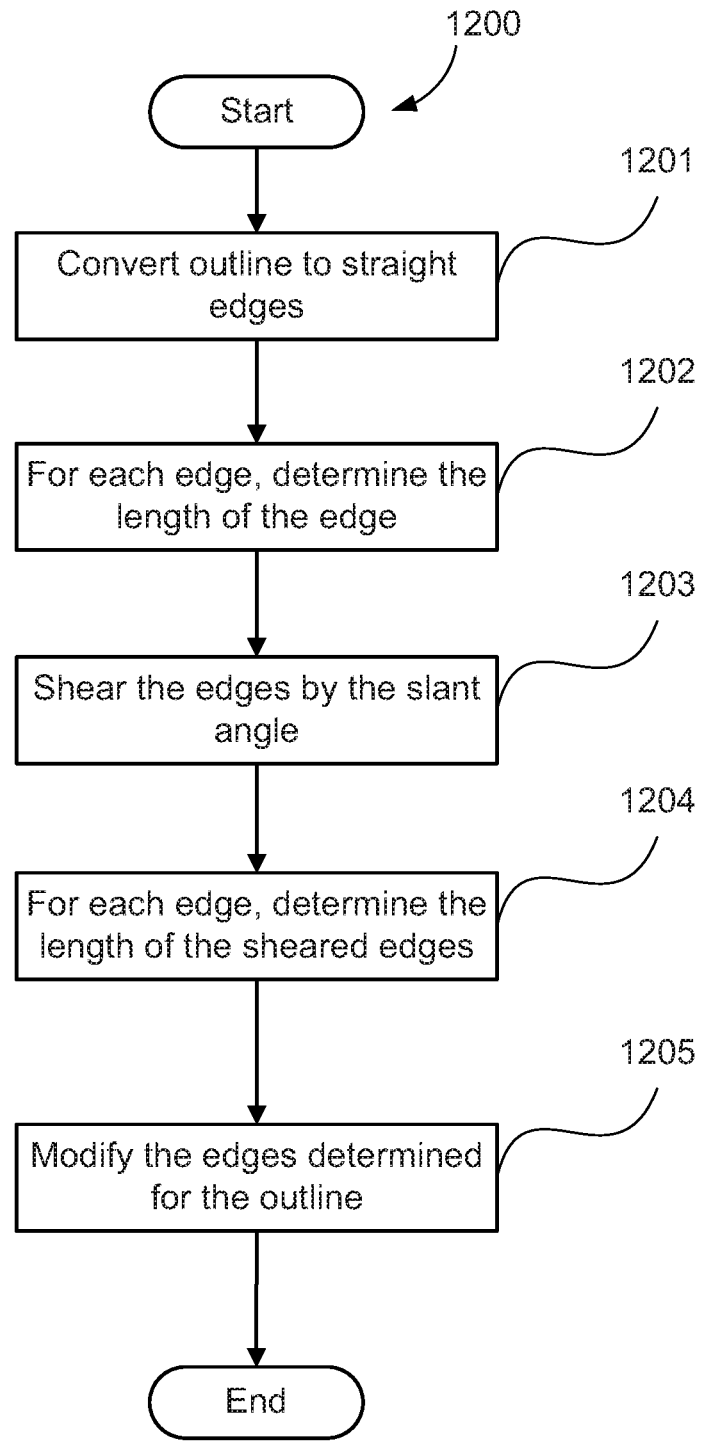
FIG. 12 is a schematic flow diagram showing another method of modifying a character outline.

The method 1200 of modifying the character outline description, which may alternatively be executed at step 603, will now be described with reference to FIG. 12.

The method 1200 may be implemented as one or more code modules of the software application program 133 resident on the hard disk drive 110 and being controlled in its execution by the processor 105.

The method 1200 begins at converting step 1201 where the outline received at step 601 is converted to straight edges. The converted outline may be stored in the memory 106 by the processor 105.

Then at determining step 1202, the length of each of the straight edges determined at step 1201 is determined, under execution of the processor 105. The length of the straight edges determined at step 1202 may be stored in the memory 106.

At shearing step 1203, the edges forming the outline of the character are then sheared by the slant angle received at step 602, under execution of the processor 105. The edges forming the outline are sheared as described above in relation to step 703.

The shearing process performed at step 1203 modifies the edge lengths and as such, at length determining step 1204 the length of each sheared edge is determined under execution of the processor 105. The length of each sheared edge determined at step 1203 may be stored in the memory 106.

At modifying step 1205 the edges determined for the outline character at step 1201 are modified. At step 1205, the edges are modified by subjecting the edges to a stroke emboldening process under execution of the processor 105. The stroke emboldening process is performed using the original edge length values determined at step 1202 and the sheared edge length values determined at step 1204. For each edge of the outline, an emboldening amount is determined as a ratio of sheared edge lengths determined at step 1204 and the edge lengths determined at step 1202.

The step of emboldening each edge at step 1205 may be performed by examining the length of each of the edges before shearing is performed and the length of the edges after shearing is performed. The emboldening of each edge at step 1205 requires less processing than measuring the width of the stroke to determine valid pairs of edges for strokes as executed in the method 700. Additionally, in accordance with the method 1200, the change in thickness of the character strokes is related to the change in the length of the edges, thereby enabling an efficient method for determining the amount of emboldening to be performed.

Figure 13:
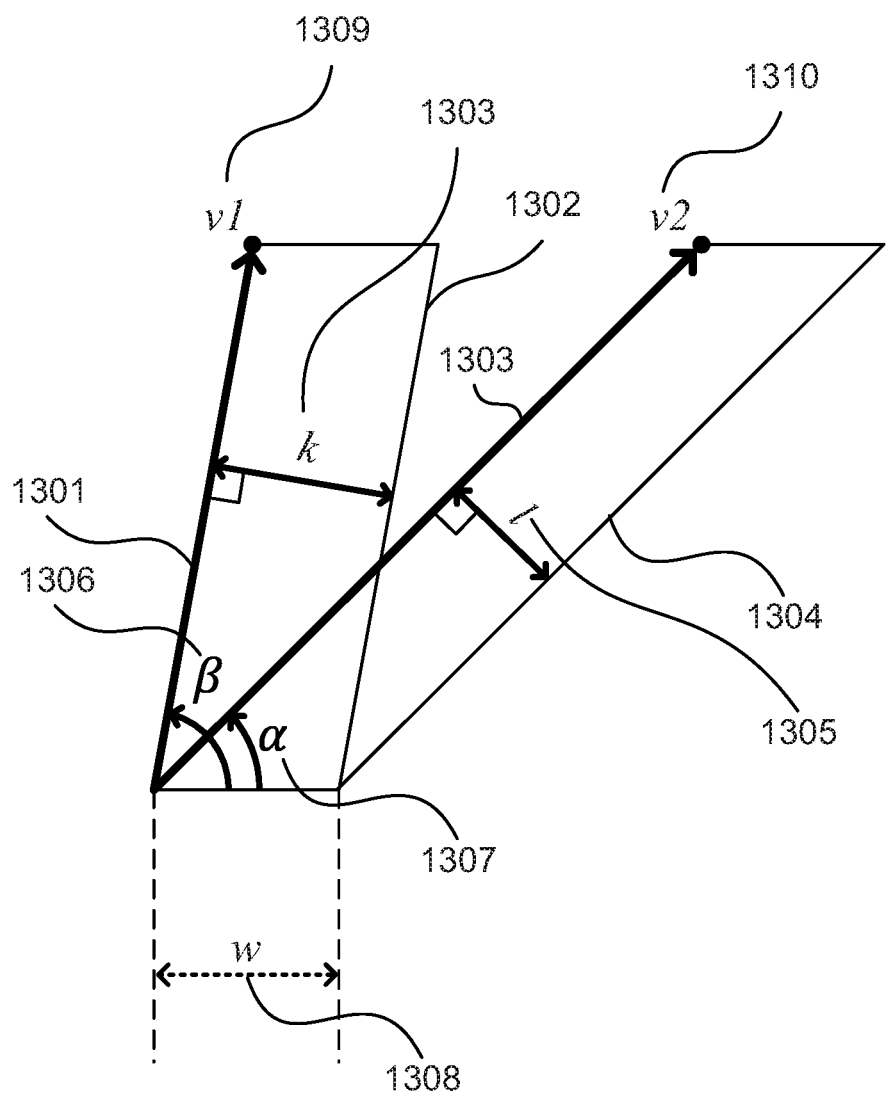
FIG. 13 is a diagram showing the relationship between the change in stroke width relative to the change in length of the sheared edges.

FIG. 13 is a diagram showing the relationship of the edge lengths with the stroke widths. For example, edge 1301 with an opposing edge 1302 has a measurable distance k 1303, measured at an angle that is orthogonal with the original edge 1301. When the two edges 1301 and 1302 are sheared to produce corresponding sheared edges 1303 and 1304, the distance between the sheared edges 1303 and 1304 is distance l 1305. The horizontal distance between the original edges 1301 and 1302 has distance w 1308. Similarly, as the shearing step 1203 does not modify the horizontal distances between edges, the horizontal distance between sheared edges 1303 and 1304 is also distance w 1308. Also, as the first edge 1301 is orientated at an angle β 1306 and the corresponding sheared edge is orientated at an angle α 1307, a mathematical relationship may be formed between the stroke widths k and l in accordance with Equation (1) as follows:

$$\sin\beta = \frac{k}{w} \text{ and } \sin\alpha = \frac{l}{w} \qquad (1)$$

$$\frac{k}{\sin\beta} = \frac{l}{\sin\alpha}$$

$$\therefore \text{change in thickness} = \frac{l}{k} = \frac{\sin\alpha}{\sin\beta}$$

While the change in stroke width is related to the change in orientation of the edges, it is inefficient to be determining the change in thickness by evaluating expensive trigonometric expressions. If the edges are represented by a vector v1 1309 for the original edge 1301, expressed in the parametric form $v_1=(x_1, y_1)$ and v2 1311 for the sheared edge 1303 is also expressed in the parametric form $v_2=(x_2, y_2)$, then the change in width value may be expressed in accordance with Equation (2), as follows:

$$\text{change in thickness} = \frac{l}{k} = \frac{\sin\alpha}{\sin\beta} \qquad (2)$$

$$= \frac{y_2}{|v_2|} \div \frac{y_1}{|v_1|}$$

$$= \frac{|v_1|y_2}{|v_2|y_1}$$

However, the shearing operation, which is performed in the horizontal direction to produce an oblique style, does not modify the vertical coordinates means that $y_1=y_2$, therefore allowing Equation (2) to be reduced to form Equation (3) as follows:

$$\text{change in thickness} = \frac{|v_1|}{|v_2|} \qquad (3)$$

Equation (3) may be used to efficiently determine the expected change in stroke thickness by examining the changes that occur to the edges, to allow the calculation to be performed without determining the strokes and calculating the stroke widths. It is sufficient therefore to determine the stroke width changes by calculating the change in edge lengths without using trigonometric calculations to lower processor requirements and/or to reduce power requirements from the processor 105.

The method 1200 will be further described by way of example with reference to FIGS. 10A and 10B. For the example of FIG. 10A, where correction of the stroke width was performed on a set of edges, the stroke width w 1004 does not need to be determined in accordance with the method 1200. Instead, the edge length l1 1016 is determined in accordance with the method 1200.

FIG. 10B shows the set of edges 1001 of FIG. 10A subject to a shearing operation. The shearing operation modifies the edge 1001 to produce shared edge 1018 with a length l2 1017. Boldness amount b 1010 is subsequently determined as a ratio of original edge length l1 1016 and sheared edge length l2 1017, to enable the stroke width to be preserved by allowing the result shown in FIG. 10D.

INDUSTRIAL APPLICABILITY

The arrangements described are applicable to the computer and data processing industries and particularly for the described methods.

The foregoing describes only some embodiments of the present invention, and modifications and/or changes can be made thereto without departing from the scope and spirit of the invention, the embodiments being illustrative and not restrictive.

The invention claimed is:

1. A method of modifying a font character, the method comprising:
receiving an outline of the font character, the outline being a vector representation of the character;
receiving a slant angle parameter to be applied to the font outline, the slant angle specifying an amount of shearing to be applied to the font outline;
determining a modified stroke width for each segment of the font outline according to an initial angle of the segment and the slant angle, the modified stroke width determined for a corresponding one of the segments being proportional to ratio of a length of the corresponding segment before and after applying the slant angle to the outline, the length of the corresponding segment changing due to application of the slant angle, wherein the modified stroke width determined for the corresponding segment is used for adjusting an initial stroke width of the corresponding segment to compensate for changes to stroke width of the corresponding segment caused by applying the slant angle; and
rendering the font character by applying each one of the determined modified stroke widths to the segment corresponding to each determined modified stroke width.

2. The method according to claim 1, further comprising applying a shearing transform to the outline.

3. The method according to claim 1, further comprising converting the outline to straight edges.

4. The method according to claim 1, further comprising performing a stroke emboldening process on each segment to determine the modified stroke width for each segment.

5. The method according to claim 4, wherein non-uniform emboldening is performed on the segments.

6. A system for modifying a font character, the system comprising:
a memory for storing data and a computer program;
a processor coupled to the memory for executing the computer program, the computer program comprising instructions for:
receiving an outline of the font character, the outline being a vector representation of the character;
receiving a slant angle parameter to be applied to the font outline, the slant angle specifying an amount of shearing to be applied to the font outline;
determining a modified stroke width for each segment of the font outline according to an initial angle of the segment and the slant angle, the modified stroke width determined for a corresponding one of the segments being proportional to ratio of a length of the corresponding segment before and after applying the slant angle to the outline, the length of the corresponding segment changing due to application of the slant angle, wherein the modified stroke width determined for the corresponding segment is used for adjusting an initial stroke width of the corresponding segment to compensate for changes to stroke width of the corresponding segment caused by applying the slant angle; and
rendering the font character by applying each one of the determined modified stroke widths to the segment corresponding to each determined modified stroke width.

7. An apparatus for modifying a font character, the apparatus comprising:
means for receiving an outline of the font character, the outline being a vector representation of the character;
means for receiving a slant angle parameter to be applied to the font outline, the slant angle specifying an amount of shearing to be applied to the font outline;
means for determining a modified stroke width for each segment of the font outline according to an initial angle of the segment and the slant angle, the modified stroke width determined for a corresponding one of the segments being proportional to ratio of a length of the segment before and after applying the slant angle to the outline, the length of the corresponding segment changing due to application of the slant angle, wherein the modified stroke width determined for the corresponding segment is used for adjusting an initial stroke width of the corresponding segment to compensate for changes to stroke width of the corresponding segment caused by applying the slant angle; and means for rendering the font character by applying each one of the determined modified stroke widths to the segment corresponding to each determined modified stroke width.

8. A non-transitory computer readable medium having a computer program stored on the medium for modifying a font character, the program comprising:

code for receiving an outline of the font character, the outline being a vector representation of the character;

code for receiving a slant angle parameter to be applied to the font outline, the slant angle specifying an amount of shearing to be applied to the font outline;

code for determining a modified stroke width for each segment of the font outline according to an initial angle of the segment and the slant angle, the modified stroke width determined for a corresponding one of the segments being proportional to ratio of a length of the corresponding segment before and after applying the slant angle to the outline, the length of the corresponding segment changing due to application of the slant angle, wherein the modified stroke width determined for the corresponding segment is used for adjusting an initial stroke width of the corresponding segment to compensate for changes to stroke width of the corresponding segment caused by applying the slant angle; and code for rendering the font character by applying each of the determined modified stroke widths to the segment corresponding to each determined modified stroke width.

\* \* \* \* \*